Oct. 29, 1968   G. S. TARBOX   3,407,662
SIGHT GLASS MOUNTING AND ADJUSTING MEANS
Filed May 16, 1966
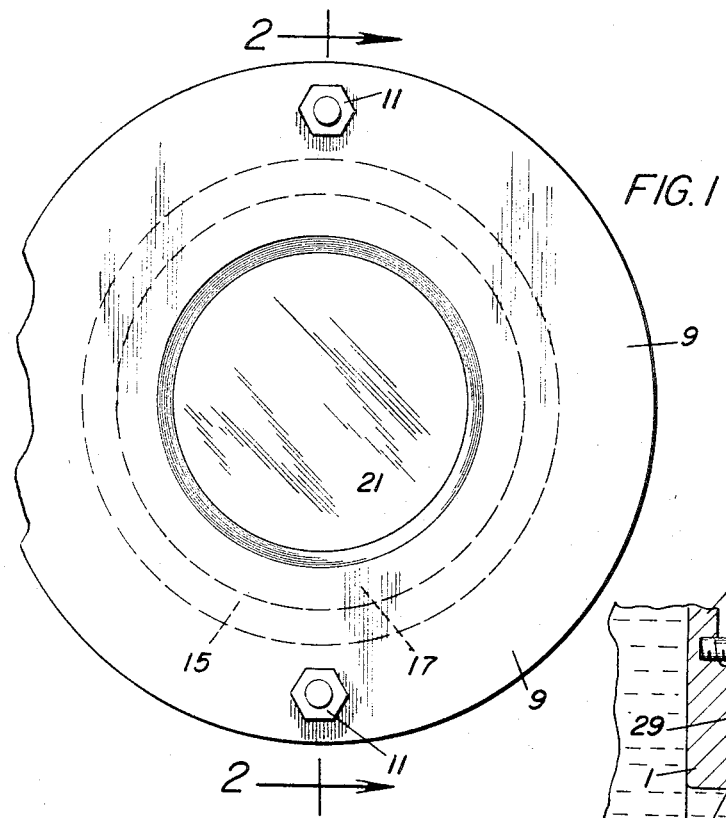
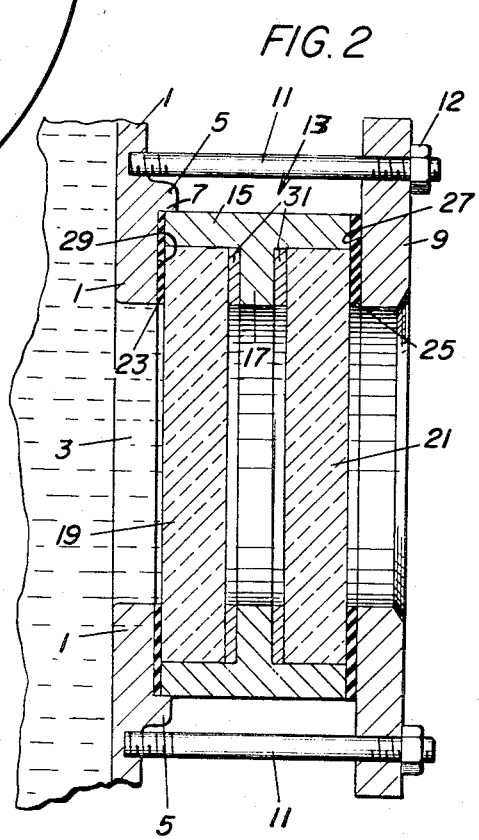
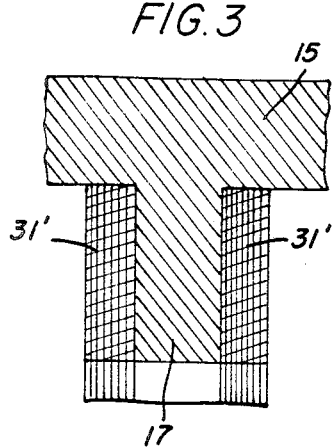
INVENTOR.
George S. Tarbox
BY
Peck & Peck
ATTORNEYS United States Patent Office 3,407,662
Patented Oct. 29, 1968

3,407,662
SIGHT GLASS MOUNTING AND
ADJUSTING MEANS
George S. Tarbox, Yonkers, N.Y., assignor to Jacoby-
Tarbox Corporation, Yonkers, N.Y., a corporation of
New York
Filed May 16, 1966, Ser. No. 550,386
5 Claims. (Cl. 73—325)

ABSTRACT OF THE DISCLOSURE

Mounting means for sight glasses comprising a holder therefor and adjusting means coactive with the sight glasses and the holder for adjusting the position of the sight glasses relative to the holder for accommodating sight glasses of different thicknesses.

---

This invention relates broadly to the art of sight glasses, and in its more specific aspects it relates to sight glasses which are installed in pressurized or non-pressurized fluid flow lines, tanks, processing equipment, and the like, the mounting and arrangement thereof provides substantial safety against the breakage or blowing out of the two glasses which form components of my sight glass combination or the leakage of fluid past the glasses; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

One of the problems which has been encountered in the field of sight glasses for visual inspection of contained or flowing fluids, is the danger of blowing out or breakage of the sight glass or glasses which can cause widespread damage to plant, equipment and personnel, as well as disruption of production. Thus, it will be appreciated, and is understood by anyone who is knowledgeable in this field that a safety or substantially foolproof sight glass is of great significance and importance.

The sight glass which I have devised and is disclosed hereinafter overcomes the many disadvantages characteristics of prior sight glasses and provides a double glass, or dual window construction, which is so mounted and arranged that if one glass is broken or blown out, the other glass of the pair of glasses will maintain its position preventing escape of fluid until the shutdown of the operation may be accomplished.

I am aware that many prior arrangements have been suggested for preventing blowouts and breakage of one or more glasses in the conventional sight glass or sight glass opening in a flow line, tank or the like. Certain of these prior art devices attempt to accomplish the purpose by mounting the glass or glasses so that they are peripherally surrounded by sealing and cushioning means in an endeavor to take care of unusual strains and stresses on the glass or glasses. Other prior arrangements attempt to cure the problem by means which impart such strains and stresses to the glass peripheries in order to prevent glass breakage and the resulting dangers from inflammable, poisonous and the like fluids.

From my experience in this field, it is evident while such prior art suggestions, and others, may reduce the chance of glass breakage, and leakage, they do not eliminate it, and furthermore, these prior arrangements of which I have knowledge, are not economical to produce or install. A further problem which is encountered in this field results from the fact that the glasses, as they are received for incorporation into a sight glass, are normally subject to thickness variation. While I am aware that such glasses which vary in thickness may be ground so that they will be of uniform thickness, such grinding of the glasses is expensive, time consuming and makes the production of sight glasses using a precision ground glass completely uneconomical, noncompetitive and impractical. One of the significant features of my invention consists in a mounting structure and arrangement whereby glasses of varying thickness may be successfully used, and this thickness variation taken into account so that the danger of leakage will still be eliminated, as will become clear as this description is proceeded with.

I have discovered that it is essential, as a safety feature, that the surfaces of the two glasses be in a particular plane with respect to the holder in a sight glass installation in order to prevent leakage. Obviously, in the absence of my novel mounting and arrangement, this will not be possible due to the variations in the glass thickness as supplied to the sight glass manufacturer, and for other reasons. I have provided, and will explain in detail hereinafter, a means whereby this glass thickness variation is taken into consideration in the mounting of the glasses in the holder of the sight glass, so that the surface of the glasses are in the plane of the holder to completely seal the installation against fluid leakage, and to strengthen each, and especially the outer glass, of the pair of glasses against breakage or blowing out.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 1 is an outside elevational view of my sight glass installed providing a sight window to the inside of a flow line, tank or any type of processing equipment.

FIG. 2 is a view taken on the line 2—2 of FIG. 1.

FIG. 3 is an enlarged sectional view of the assembly particularly illustrating the laminated gaskets.

In the accompanying drawings, I have used the numeral 1 to designate the wall of a fluid flow line, tank or other processing equipment with which my sight glass may be used, and I have provided an opening 3, preferably of circular configuration, in the wall 1, over which my sight glass is positioned so that it serves as a sight window for visual inspection of the fluid within the flow line, tank or the like, having the wall 1. Adjacent to, but radially spaced from the periphery of the opening 3, I provide an outwardly directed annular projection 5, providing a continuous annular shoulder 7, for a purpose which will hereinafter be described in detail.

A retaining ring 9, having an I.D. substantially equal to the diameter of opening 3, is combined with the wall 1 of the flow line, tank or the like in order to maintain the sight glass combination in proper position, as will become evident as this description proceeds. The retaining ring 9 is connected in spaced relation to the wall 1 by means of bolts 11 which extend from and through the retaining ring and to and into a drilled and tapped opening in the wall 1, as will be clear from consideration of the drawings. The bolts may be tightened or loosened by nuts 12. The space between the elements 9 and 1 is where the components forming the sight glass are mounted and maintained in position sealing the opening 3 against escape of the contained fluid, and insuring against breakage of both of the glasses which are used in my sight glass.

The sight glass includes a holder which I have designated in its entirety by the numeral 13. This holder holds and maintains the pair of glasses in proper position, as will be clearly explained. The holder 13 comprises a ring or annular member 15 of a diameter which is greater than the diameter of the opening 3 in the wall of the flow line, tank or the like, and the O.D. of the ring 15 is substantially the same as the diameter of the area defined between diametrically opposed points on the shoulder 7 of the annular projection 5. The ring or annulus 15 is of substantial width, sufficient width to accommodate a pair of glasses with their sealing and adjusting means.

Intermediate the width of the ring 15 is a radially inwardly extending flange 17, the width of which, as will become clear, determines the spacing between the pair of glasses which are used in the sight glass combination.

The sight glass combination includes an inner glass 19 and an outer glass 21, which are spaced apart when they are mounted in the combination. The diameter of the glasses 19 and 21 are substantially the same as the I.D. of the ring 15.

I provide an annular sealing gasket 23 which is of a width which is substantially equal to the width of that portion of wall 1 between shoulder 7 and the edge of the opening 3, so that the external edge or periphery of this sealing gasket abuts against the shoulder 7, and the inner edge or periphery thereof is in line with the edges of the opening 3, and the entire inner flat surface of the sealing gasket 23 is in engagement with the wall 1. The inner glass 19 is positioned between the flange 17 and abuts and seals against the sealing gasket 23, and when the sight glass combination is installed in operative position, the inner glass forces the gasket 23 against the wall 1 in sealing relation with respect thereto.

I provide a further sealing gasket 25 which is dimensionally the same as the sealing gasket 23 and functions in generally the same manner. The outer glass 21 is positioned between the flange 17 and the sealing gasket 25, and when the combination is operatively installed, the outer glass 21 will abut and press against the gasket 25 to force it into sealing engagement with the ring 9 and with the outer glass.

One of the significant characteristics of my invention resides in the novel adjusting feature, for the glasses 19 and 21, which I have devised. The glass discs which are used for the glasses 19 and 21, as received, are subject to variations in the thickness thereof and, as I shall explain, taking into account the thickness of the glass is important in providing a sound seal, and in preventing the breakage or blowing out of both glasses which, as explained, is a serious and dangerous occurrence.

It is important that the exterior surface of glass 21 be in the same plane as the vertical plane of the outer edge 27 of the ring 15 of the holder 13, and it is important that the interior surface of the glass 19 be in the same plane as the vertical plane of the inner edge 29 of the ring 15 of the holder 13. Such structural relationships insure proper sealing, particularly should the inner glass 19 break, since, with the aforementioned co-planar relationship between the exterior surface of the outer glass 21 and the edge 27 of ring 15 a tight sealing fit is assured between the glass 21 and the gasket 25 to thereby prevent leakage until a shutdown may be made to replace the broken glass.

It is recognized that the glass may be precision ground so as to provide uniform and desired thickness in the glass discs. However, such grinding is costly and time consuming, and I have devised means in combination with the novel holder I have described whereby grinding is unnecessary and the thickness variation is readily taken into account and the usual problems occasioned thereby are overcome.

In order to take into account this glass thickness variation, I employ a pair of non-compressible gaskets 31, one being disposed between the flange 17 and the exterior surface of the inner glass 19, while the other is disposed between the flange 17 and the interior surface of the outer glass 21. Now I propose to use non-compressible gaskets 31 of varying sizes, depending upon the thickness of the glasses 19 and 21. Thus, by using or preselecting non-compressible gaskets of varying thickness, I am enabled to obtain the desired structural relationships, that is, by this simple means, I can insure that the interior surface of glass 19 will be co-planar with the edge 29 to thereby obtain the desired sealing results as pointed out above.

It is within my contemplation to use laminated metal, or the like material gaskets 31', as illustrated in FIG. 4, so that by peeling off one or more of the laminations, the thickness of the gasket being used may be altered to thereby properly place and position the glasses 19 and 21.

It will now be appreciated that either of the noncompressible gaskets 31 and 31' are coactive with and in engagement with the holder and are coactive with and in engagement with each of the glasses so that the positions of the glasses relative to the holder may be adjusted according to the thickness of the gaskets preselected to insure that the interior surface of glass 19 will be coplanar with the edge 29 and the exterior surface of glass 21 will be coplanar with the edge 27 of the holder.

It will, of course, be understood that the sight glass combination is installed and the components thereof maintained in their desired operative positions by means of the ring 9 and the bolts 11, and that these components are tightly held together by tightening the nuts 12 the proper amount.

I claim:

1. A sight glass including, in combination, an inner glass and an outer glass, means for mounting said glass in position covering and sealing an opening in a fluid containing member, said means including a holder for the glasses, said holder being provided with inner and outer edges and said glasses being circular, and further means coactive with and in engagement with the holder and coactive with and in engagement with each of said glasses, and said further means being preselected to position the outer surface of the outer glass in the plane of the said outer edge of the holder and to position the inner surface of the inner glass in the plane of said inner edge of the holder.

2. A sight glass in accordance with claim 1, wherein said holder for the glasses comprises an annular element of greater width than the combined thickness of the glasses, and said annular element is provided with a radially inwardly extending flange intermediate the edges of said annular element, and the inner glass of said glasses is positioned on the inner side of said radially inwardly extending flange, while the outer glass is positioned on the outer side of said radially inwardly extending flange, said further means is positioned between said radially inwardly extending flange and said inner glass and is further positioned between said radially inwardly extending flange and said outer glass.

3. A sight glass in accordance with claim 2, wherein said further means comprises noncompressible gaskets.

4. A sight glass including, in combination, a fluid containing member having an opening therein, means closing and sealing said opening to prevent leakage of fluid therethrough, said means comprising an inner transparent glass and an outer transparent glass, a holder for the glasses, said holder comprising an annular element of a width greater than the combined thickness of the inner and outer glasses and being provided with a radially inwardly extending flange intermediate the inner and outer edges of said annular element, said inner glass being disposed on the inner side of said radially inwardly extending flange and the outer glass being disposed on the outer side thereof, noncompressible means being positioned between the radially inwardly extending flange and the inner and outer glasses, and a ring positioned externally and spaced from said fluid containing member and of a width extending over a part of the surface of said outer glass, said fluid containing member extending over a part of said inner glass, sealing means between said ring and said outer glass and further sealing means between said inner glass and said fluid containing member, additional means connected to said fluid containing member and said ring and extending therebetween for maintaining the inner and outer glasses, the sealing means and the noncompressible means in operative positions sealing and closing the opening in the fluid containing member.

5. A sight glass in accordance with claim 4, wherein said noncompressible means comprises a pair of laminated gaskets for varying the thickness of the gaskets by removing at least one lamination.

References Cited

UNITED STATES PATENTS

| | | | |
|---|---|---|---|
| 1,100,707 | 6/1914 | Brix | 73—330 |
| 2,423,492 | 7/1947 | Fairbank | 350—252 |
| 1,240,251 | 9/1917 | Pocock | 73—330 |
| 1,703,426 | 2/1929 | Kerr | 73—330 |
| 1,768,652 | 7/1930 | Yordon. | |
| 2,773,387 | 12/1956 | Miller | 73—330 |

FOREIGN PATENTS 909,527 10/1962 Great Britain.

S. CLEMENT SWISHER, *Acting Primary Examiner.*

DANIEL M. YASICH, *Assistant Examiner.*